United States Patent [19]
Akima et al.

[11] Patent Number: 5,312,155
[45] Date of Patent: May 17, 1994

[54] STRUCTURE OF FOOTREST IN VEHICLE SEAT

[75] Inventors: Hiroaki Akima; Tetsuo Ikeda, both of Akishima, Japan

[73] Assignee: Tachi-S Co., Ltd., Akishima, Japan

[21] Appl. No.: 894,090

[22] Filed: Jun. 5, 1992

[51] Int. Cl.$^5$ ............................................. A47C 7/50
[52] U.S. Cl. .......................... 297/180.13; 297/423.27; 297/423.1
[58] Field of Search ................... 297/180.13, 424, 425, 297/423.1, 423.26, 423.27

[56] References Cited
U.S. PATENT DOCUMENTS

| | | | |
|---|---|---|---|
| 807,831 | 12/1905 | Leslie | 297/425 X |
| 1,775,607 | 9/1930 | Tranchell | 297/180 X |
| 2,093,455 | 9/1937 | Knight | 297/425 X |
| 2,602,490 | 7/1952 | Earl | 297/425 |
| 3,462,194 | 8/1969 | Gielow et al. | 297/425 |
| 3,856,352 | 12/1974 | Jacobi, Sr. | 297/425 |
| 3,936,093 | 2/1976 | Hogan | |

FOREIGN PATENT DOCUMENTS 56-70337 6/1981 Japan.

Primary Examiner—Peter R. Brown
Attorney, Agent, or Firm—Oldham, Oldham & Wilson Co.

[57] ABSTRACT

A structure of a footrest body in a vehicle seat, in which an air blower is provided under the seat to supply a hot or cold air toward a back side of the seat, and the footrest is equipped on the back wall of seat, with the free end of footrest body being contacted with a floor. In such type of footrest body structure, an opening is defined in the footrest body, though which opening the hot or cold air is permitted to be flowed from the blower toward the back side of seat, without hindrance of the footrest body body per se. It is further arranged that the footrest body can be lowered when it is set in the upright non-use position, to thereby improve the aesthetic appearance of the back wall of seat.

7 Claims, 2 Drawing Sheets

STRUCTURE OF FOOTREST IN VEHICLE SEAT

BACKGROUND OF INVENTION

1. Field of the Invention

The present invention relates to a footrest used in a vehicle seat such as an automotive seat, and in particular to a footrest structure provided in a front seat, wherein a ventilation opening is arranged such as to permit a hot or cold air to be flowed therethrough towards an occupant on a rear seat behind the front seat.

2. Description of Prior Art

As typically seen in a train or the like, a foot rest is equipped on the rear side of seat in order to receive thereon the foot of an occupant on a rear seat. Most of ordinary footrests are of such a structure that the body thereof bridges over the seat and floor in an inclined way, with its free end resting on the floor.

However, this sort of footrest structure has been defective, as applied to a front seat structure with a heat or cool air blower provided under the seat, in that the air sent from the lower is blocked by the footrest body and can not be supplied to the rear-seat occupant.

On the other hand, there is known a footrest structure wherein the footrest may be positioned such as to extend horizontally from the seat cushion without contact with the floor, thus providing a clearance between the seat and footrest, as disclosed in the Japanese Utility Model Laid-Open Pub. No. 56-70337. This permits a hot or cool air to be flowed through the footrest, to some extent, in a direction to a rear seat, but it does not supply a full stream of the air towards an occupant sitting on the rear seat because of the mass of footrest. Moreover, according to that prior art, the footrest is connected pivotally via a movable link to a stationary link, such that the footrest is rotatable with the movable link vertically about the free end of the stationary link. Consequently, the footrest, when not in use, is placed in an upright position, extending upwardly along the rearside wall of seat back, whereas when in use, the footrest is placed in a horizontal position, extending backwardly toward the rear seat. But, it has been found as another defective aspect that when the footrest is in the non-use upright position, the back surface of seat back is impaired its aesthetic appearance by the elevated, standing state of the footrest.

SUMMARY OF THE INVENTION

In view of the above-stated drawbacks, it is a purpose of the present invention to provide an improved structure of a footrest body in a vehicle seat which positively permits a sufficient flow of a hot or cold air without hindrance towards an occupant on a rear seat behind the seat.

To attain this purpose, according to the present invention, there is basically provided a footrest body structure in a vehicle seat, in which an air blower is provided under the seat to supply a hot or cold air toward a back side of the seat, lower being fixed on a floor, and the footrest body is equipped on a back wall of said seat such that a free end of the footrest body is contacted with the floor, and in which an opening means is defined in the footrest body, through which opening means the hot or cold air is permitted to be flowed toward the back side of the seat, and a link means is arranged between the footrest body and the back wall of the seat, whereby the footrest body is displaceable between a use position where the free end of the footrest body is contacted with the floor and a non-use position where the footrest body stands upright upon the link means, extending along the seat back wall.

Accordingly, the opening means provides a flow passage through which the air is freely flowed without interference with the footrest per se, and thus even when the footrest is set in the use position, the air is supplied sufficiently towards the occupant on the rear seat.

Preferably, the opening means comprises a ventilation opening which is perforated in the footrest body in a shape of an elongated ellipse, such that the opening is elongated in the width-wise direction of the footrest body. More preferably, such ventilation opening should be defined at a lower area of the footrest away from an area of the same where the feet of the rear-seat occupant are put on, so that the opening is prevented from being closed thereby.

In another aspect of the invention, the footrest structure may be constructed such that the foregoing link means comprises a pair of stationary links or brackets which are fixed on the seat back wall and a pair of movable links, each having one end connected pivotally to one of such pair of stationary links, and that an elongated hole is formed in each of the movable links, a support pin is provided in the footrest, and a link storage bore is formed within the footrest in the vicinity of the support, with such an arrangement that the support pin of the footrest passes slidably through the elongated hole of movable link, and the link storage bore is disposed such as to receive therein another free end portion of the movable link when the footrest is placed in the nonuse position. This permits the footrest to be lowered an amount corresponding to a length of the elongated hole and a depth of the link storage bore, and therefore, the back surface of seat back may be improved in terms of aesthetic appearance.

Preferably, there should be formed a pair of slits in the base end portion of the footrest at their respective points corresponding to the foregoing two movable link, and the foregoing support pin be disposed in and transversely of each of such slit, so that the elongated hole of movable link is slidably engaged with the support pin. This will allow the another free end portion of movable link to be easily inserted into the link storage bore.

DETAILED DESCRIPTION OF PREFERRED EMBODIMENTS OF THE INVENTION

Referring to FIGS. 1 through 4, there is shown a footrest structure in accordance with the present invention, as a preferred mode, which is provided on a vehicle seat (S1).

Figure 2:
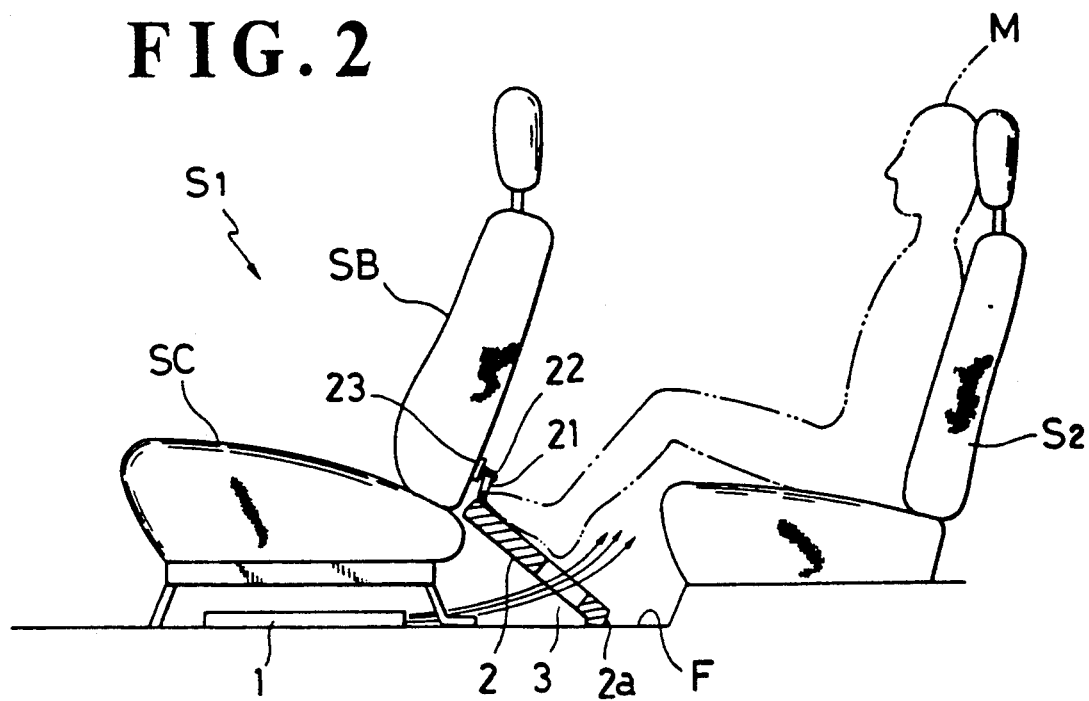
FIG. 2 is a schematic side view of the footrest structure, showing its state of use in conjunction with a rear seat.

At first, as best shown in FIG. 2, the seat (S1) is a front seat of the type where a blower (1) is located under its seat cushion (SC), the blower (1) being fixed on the floor (F) for supplying a stream of a hot or cool air toward an occupant (M) sitting on another rear seat (S2).

Designation (2) denotes a body of footrest which is movably connected to the lower end area of back surface of seat back (SB) associated with the front seat (S1), as will be explained in detail later.

Figure 1:
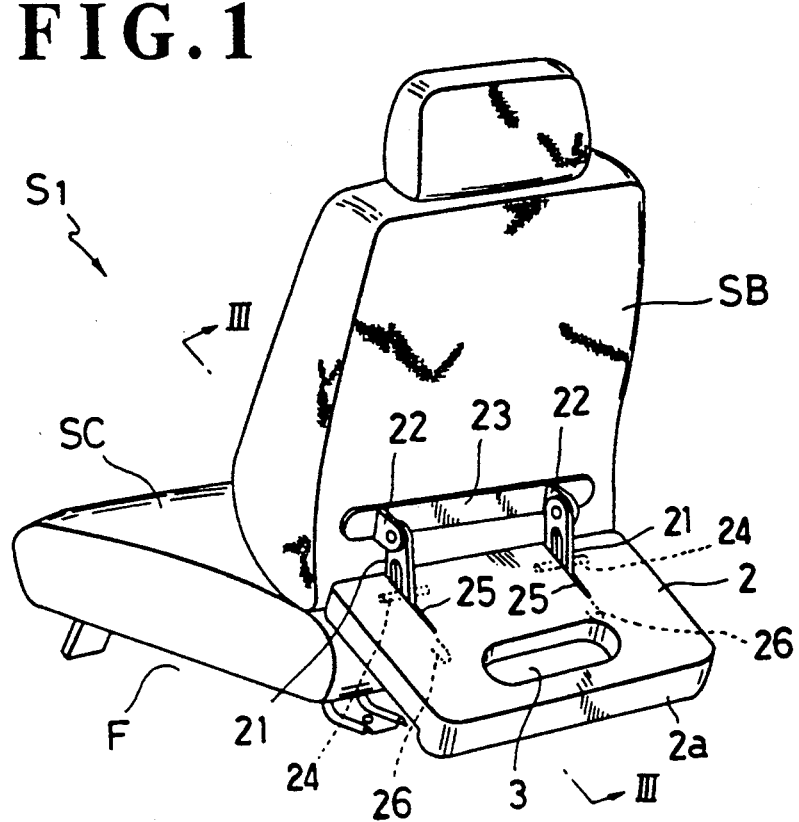
FIG. 1 is a perspective view of a footrest structure in a vehicle seat according to the present invention.
Figure 3:
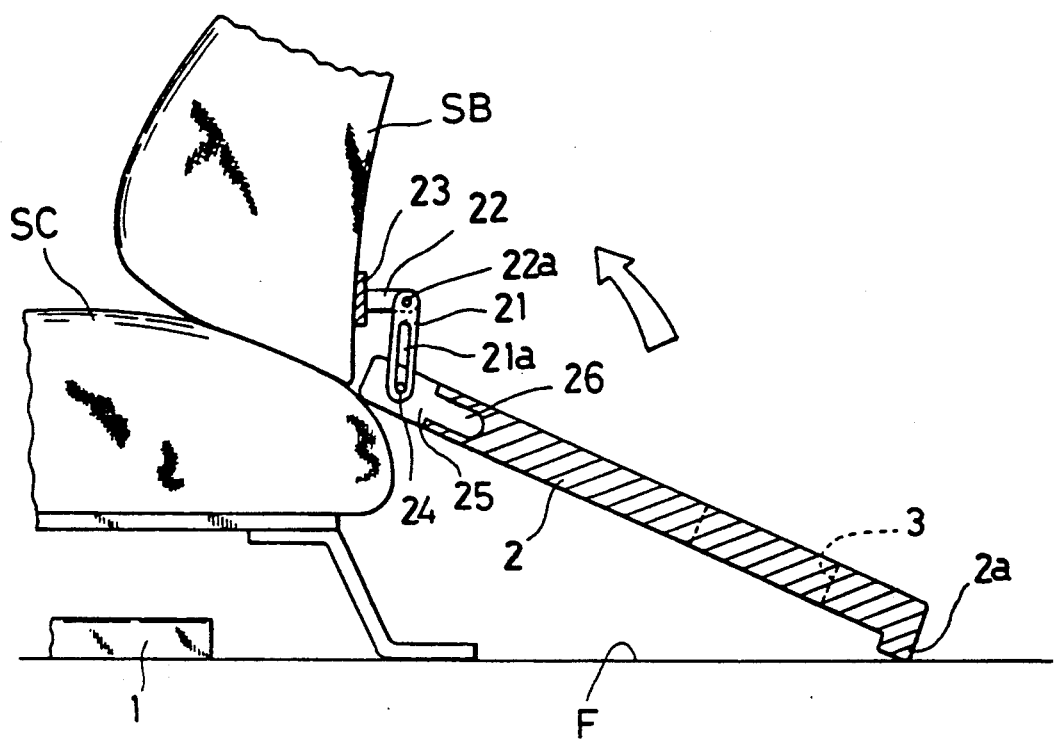
FIG. 3 is a partly broken, enlarged side view of the footrest structure, with a sectional view of a footrest thereof taken along the line III—III in FIG. 1, shows the footrest to be located in the inclined use position.

Referring now to FIGS. 1 and 3, it is observed that the footrest body (2) is formed with a ventilation opening (3) at the lower half area thereof and further formed with a pair of spaced-apart slits (25)(25) at the upper end area thereof. Specifically, the ventilation opening (3) is defined in the neighborhood of the free end area of footrest body (2) in which the abutment projection (2a) lies for contact with the floor (F). Preferably, the opening (3) should be formed in an elongated fashion as shown, at the foregoing position; in other words, the opening (3) be defined at a lower area in the footrest (2) where in most cases the occupant (M) on the rear seat (S2) will not put his or her feet on, taking into account the tendency for a person to stretch his or her legs forwardly against such inclined footrest (2). Further, preferably the opening (3) be defined at a point corresponding to a path along which the air is forced out from the blower (1), in order that a whole stream the air may be substantially sent through the opening (3) in the upward direction towards the rear-seat occupant (M) (see FIG. 2).

Each of the two slits (25), as best seen from FIG. 3, is formed by cutting the upper base end area of footrest body (2) into an incision-like configuration having a support pin (24) extended transversely of the slit at the base end of footrest body (2) (which is indicated more clearly by the phantom line in FIG. 1), and further having a link storage bore (26) formed within the footrest body (2) at a side opposite to the support pin (24). In the thus-formed slit (25), one end portion of a movable link (21) is pivotally connected to the support pin (24) at the elongated hole (21a): Namely, the elongated hole (21a) is formed in such one end portion of movable link (21), extending a predetermined distance along the longitudinal direction of movable link (21) toward another end portion of same. This another end of movable link (21), as shown, is pivotally connected with the free end (22a) of a stationary link or bracket (22) which is fixed at its base end on a rigid support plate (23). As best shown in FIG. 1, the support plate (23) is fixed at the lower end area of back surface of seat back (SB), and the bracket (22) projects horizontally from the support plate (23).

Figure 4:
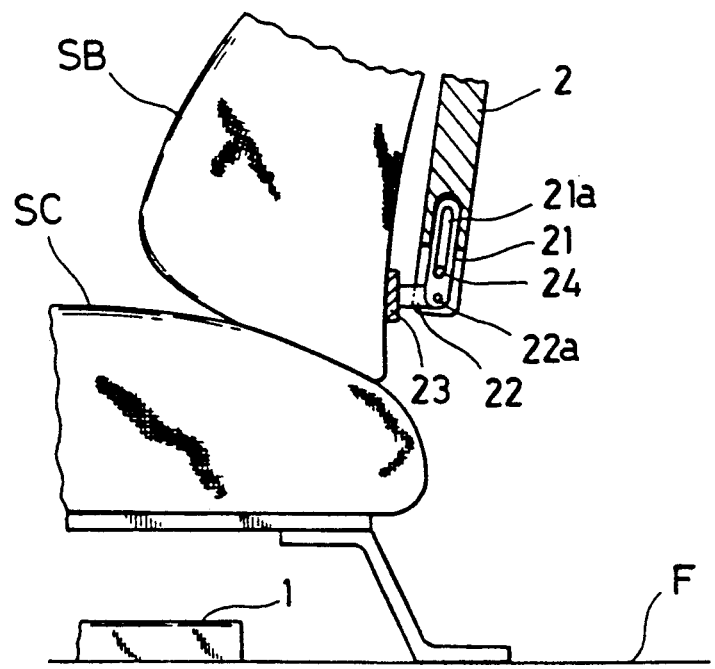
FIG. 4 is a partly broken, enlarged side view of the footrest structure, likewise as in FIG. 3, which shows the footrest to be located in the nonuse upright position.

With this structure, as understandable from FIGS. 3 and 4, when it is desired to displace the footrest body (2) from the inclined use position as in FIG. 3 up to the upright non-use position as in FIG. 4, the first step is to rotate the footrest body (2) about the pivot point (22a) upwardly as indicated by the arrow in FIG. 3, until the movable link (21) stands upright upon the stationary bracket (22) as seen in FIG. 4. At this moment, the footrest body (2) is also being in an upright state relative to the bracket (22). Though not shown, at that point, the pin (24) is located at one extremity of elongated hole (21a) which lies at the free end part of movable link (21), likewise as in FIG. 3. Then, secondly, the footrest body (2) is lowered towards the bracket (22) so that the free end portion of movable link (22) is inserted into the link storage bore (26), with the support pin (24) sliding down along the elongated hole (21a) to reach another opposite extremity thereof which lies at the movable link base end part (adjacent to the pivot point (22a)), as can be seen from FIG. 4. As a result, the footrest body (2) is lowered an amount corresponding to both length of elongated hole (21a) and depth of link storage bore (26), and placed in the non-use position as in FIG. 4.

In this respect, it is desirable that the aforestated predetermined distance (at which the elongated hole (21a) extends toward the foregoing another end of movable link (21)) should be given at a longest possible length within the whole length of movable link (21) and also the link storage bore (26) should have a greatest possible depth in the footrest body (2), in order that the footrest body per se (2) may be positioned at a lowest level relative to the back surface of seat back (SB). This improves much more aesthetically the appearance of back surface of seat back (SB).

It is noted that, as illustrated, on the support plate (23), a pair of the brackets (22) are fixed in a manner spacing apart from each other at distance conforming to that between the two slits (25), and that there are thus two movable links (21) connected pivotally to the respective brackets (22), with two support pins (24) extending through the respective elongated holes (21a) of movable links (21). Each of the support pins (24) is fixed to the footrest body (2) such that both ends of the former are embedded in the latter, as best shown in FIG. 1.

Accordingly, it is to be appreciated that, the present invention is endowed with the following advantages:

(i) The formation of ventilation opening (3) provides an air passage so that a hot or cool air can be sent directly from the blower towards the occupant (M) on the rear seat (S2), without obstacle due to the mass of footrest body as found in the prior art. Thus, while using the footrest body (2), the rear-seat occupant (M) can have his or her feet warmed or cooled more effectively.

(ii) By virtue of the elongated hole (21a) formed in the movable link (21) and the link storage bore (26) in the footrest body (2), it is possible to lower the level or height of the footrest body (2) relative to the back surface of seat back (SB), thereby permitting a more aesthetic improvement in that back surface of seat back (SB).

Finally, while having described the present invention as above, it should be understood that the invention is not limited to the illustrated embodiment, but any other modifications, replacements and additions may be made thereto structurally without departing from the spirit and scope of the appended claims. For example, the support plate (23) and brackets (22) may be disposed at the backward wall of seat cushion (SC), and the opening (3) may be formed in a more effective shape.

What is claimed is:

1. A structure of a footrest and a vehicle seat comprising:
   an air blower fixed on a floor of a vehicle under the vehicle seat, said air blower being adapted to supply a hot or cold air toward a back side of said vehicle seat;
   a footrest body provided movably on a back wall of said vehicle seat;
   an opening perforated in said footrest body;
   a link means arranged between said footrest body and said back wall of said seat;

said footrest body being displaceable via said link means between a user position where said footrest body bridges over a spacing between said back wall of said seat and said floor of said vehicle, with one free end of said footrest body being contacted with said floor, and a non-use position where said footrest body stands upright on said link means, extending along said seat back wall;

wherein, when said footrest body is located at said use position, said opening permits said hot or cold air to flow therethrough from said air blower toward said back side of said seat.

2. The structure as claimed in claim 1, wherein said opening means comprises a ventilation opening which is perforated in said footrest body in a shape of an elongated ellipse, such that the opening is elongated in a width-wise direction of said footrest.

3. The structure as claimed in claim 2, wherein said ventilation opening is defined at a lower area of said footrest body away from an area of the same where an occupant, who sits on another seat behind said seat, puts his or her feet on.

4. The structure as claimed in claim 1, wherein said link means comprises a pair of stationary links which are fixed on said seat back wall and a pair of movable links, each having one end connected pivotally to one of said pair of stationary links and having another end connected pivotally to a base end of said footrest body.

5. A structure of footrest in a vehicle seat, in which an air blower is provided under said seat to supply a hot or cold air toward a backside of said seat, said blower being fixed on a floor, and said footrest body is equipped on a back wall of said seat such that a free end of said footrest body is contacted with said floor, said structure comprising:

an opening means defined in said footrest body, through which opening means said hot or cold air is permitted to be flowed toward said backside of said seat;

a link means arranged between said footrest body and said back wall of said seat, whereby said footrest body is displaceable between a user position where said free ed of said footrest body is contacted with said floor and a non-use position where said footrest body stands upright upon said link means, extending along said seat back wall;

a means for lowering a level of said footrest body with respect to said back wall of said seat; and said link means including a lowering means for allowing said footrest body to be lowered with respect to said back wall of said seat when said footrest body is located at said non-use position.

6. The structure as claimed inn claim 5, wherein said link means comprises a pair of stationary links which are fixed on said seat back wall and a pair of movable links, each having one end connected pivotally to one of said pair of stationary links, wherein said means comprises an elongated hole formed in each of said movable links, a support pin provided in said footrest body and a link storage bore formed within said footrest body in vicinity of sd support pin, with such an arrangement that said support pin of said footrest body passes slidably through said elongated hole of said movable link and said link storage bore is disposed such as to receive therein another free end portion of said movable link when said footrest body is placed in said non-use position, so that, in said non-use position, said footrest body is lowered an amount corresponding to a length of said elongated hole and a depth of said link storage bore, with respect to said seat back wall.

7. The structure as claimed in claim 6, wherein there are formed a pair of spaced-apart slits in a base end of said footrest body, such that they are disposed at points corresponding to said pair of movable links, respectively, wherein said support pin extends in and transversely of each of said pair of slits, with a free end portion each of said movable links being inserted in the respect said pair of slits and with said support pin passing slidably through said elongated hole each of said movable links, and wherein said link storage bore is formed within said footrest in a manner continuous from each of said pair of slits.

* * * * *